Figure 1:
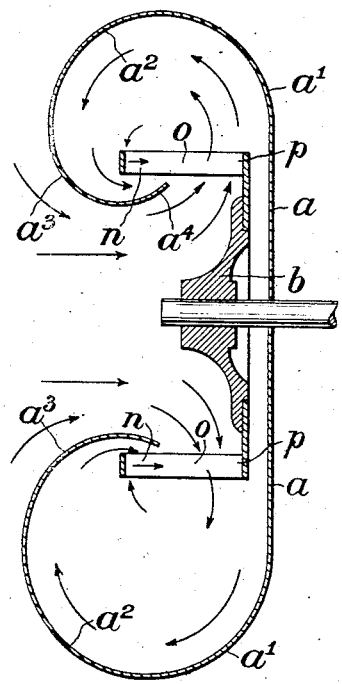

S. C. DAVIDSON.
CENTRIFUGAL FAN OR PUMP.
APPLICATION FILED NOV. 17, 1913.

1,114,866.

Patented Oct. 27, 1914.

Witnesses:

Inventor:
Samuel Cleland Davidson
By Attorneys, ns
UNITED STATES PATENT OFFICE.

SAMUEL CLELAND DAVIDSON, OF BELFAST, IRELAND.

CENTRIFUGAL FAN OR PUMP.

1,114,866. Specification of Letters Patent. Patented Oct. 27, 1914.

Application filed November 17, 1913. Serial No. 801,447.

*To all whom it may concern:*

Be it known that I, SAMUEL CLELAND DAVIDSON, of Sirocco Engineering Works, Belfast, Ireland, have invented certain new and useful Improvements in or Relating to Centrifugal Fans or Pumps, of which the following is a specification.

This invention refers to centrifugal fans or pumps of the incased type, and relates to an improved construction of the inclosing casing thereof.

In a previous British patent granted to me, No. 21,286 dated 23rd. October, 1901, I have set forth a construction and arrangement of fan and casing wherein the spiral whirl of air, which leaves the positive ends of the blades, passes over as therein described, to the negative ends of the blades, and is guided around said negative ends as far as the plane of the intake end of the fan wheel and thereat directed into the intake chamber of the fan wheel wherein it meets and mixes with the current of fresh air flowing through the eye into the center of the fan wheel. This patent is hereinafter referred to as my first prior patent.

In a further British Patent No. 1476, granted to me, and dated 18th. January, 1912, I have described certain operative phenomena whereby the air discharged from what is referred to as the "positive" ends of the fan blades, passes across, and re-enters the fan wheel centripetally through the spaces or ports between the blades at their "negative" ends. The central part of the blades between the negative and positive ends being referred to as the neutral point.

According to the present invention I employ a casing which in section surrounds but is spaced apart from the blades of a fan wheel so as to leave exposed to the intake chamber only the positive portions of the blades whereby the portion of recirculating air which has passed over and inward around the negative ends of the blades, is directed against the inner edges of the negative portions of the blades and is effectively isolated from the fresh air entering through the inlet opening or eye. For example I may combine with a fan wheel of the kind having an intake chamber within the inner edge of the blades a casing spaced apart from the periphery intake end, and inner edges of the fan wheel as to leave room for the recirculation of air around the intake ends of the blades, the terminal portion of the casing which is disposed within the intake chamber being curved outward toward the inner edges of the blades so as to effectively isolate the recirculated air from the fresh air which passes through the intake chamber to the positive portion of the blades.

The accompanying drawings show some constructions embodying the present invention.

Figure 2:
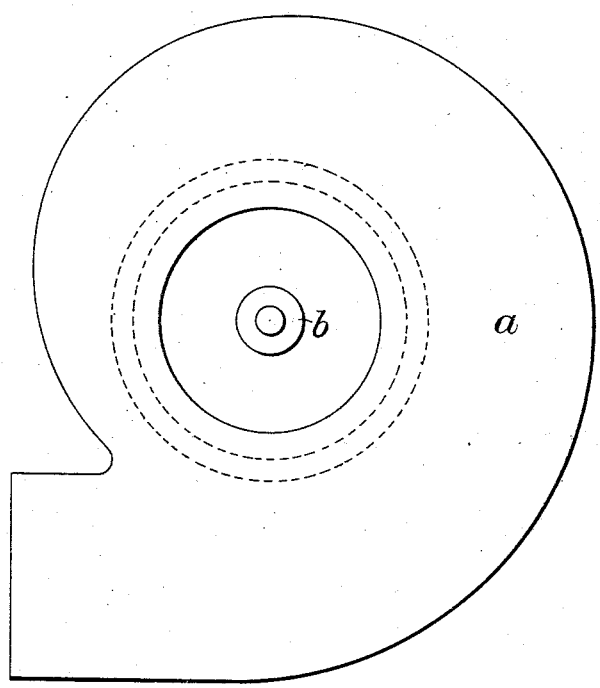
Figure 3:
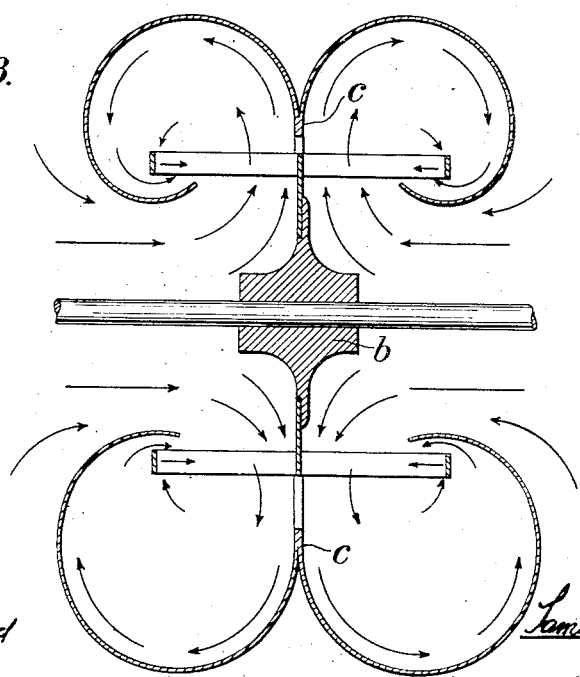

Figure 1 is a cross section of a single intake fan; Fig. 2 is a side elevation of Fig. 1; Fig. 3 is a cross section of a double intake fan.

In the construction shown in Fig. 1 which shows the application to a single intake fan, the cross sectional form of the inclosing casing $a$ is such, that, after it springs substantially radially outward at $a'$ from the back or positive end of the fan wheel $b$ it then curves over the fan blades as at $a^2$ to and beyond the plane of rotation of the negative end $n$ of the fan wheel, whereby the air being discharged from the positive end $p$ of the fan wheel whirls over, somewhat as indicated by the arrows and along the inner surface of this curved interior of the casing in what might be described as a cork-screw-like flow to and outwardly beyond the negative end of the fan wheel and by the further extension of this curvature $a^2$ inward and back through the intake opening or eye as at $a^3$ to within the plane of said negative end of the wheel so that its terminal edge $a^4$ forms a circle of less diameter than that of the inner edges of the blades and is located near to but not beyond the neutral part $o$ of the inner edges of the blades whereby the recirculating portion of the air thus guided, is directed axially along, or against the inner edges of the blades in the direction of the positive ends thereof. By this construction the portion of the recirculating air, which has passed over, and inward around the negative ends of the blades, and is finally directed axially along or against their inner edges is effectively isolated by the part $a^3$ within the plane of the negative end of the fan wheel from the current of fresh air entering the center thereof through the most restricted part of the inlet opening, or eye, which in this construction, if formed by the inward and axial extension $a^3$ of the casing to its terminal edge $a^4$ and the currents of recirculated and fresh air are smoothly mixed together without turbulence along the inner edges of the positive parts of the blades, whereas in my first prior patent, this isolation of the currents is not maintained to within the plane of the intake end of the fan wheel.

The formation of the casing will be suitably modified in the case of a double intake fan and that portion of the casing which is coincident with the central plane of the fan wheel may be carried inward toward the periphery of the fan wheel or not as may be required.

Fig. 3 shows a construction applied to a double intake fan wheel the construction being a duplication of that shown in Fig. 1, the central part of the casing being carried inward at $c$ to properly direct the currents discharged from the positive parts of the blades toward and around the negative part in the manner herein set forth.

What I claim and desire to secure by Letters Patent is:—

1. A centrifugal fan having a wheel with blades wherein the axial length is greater than the radial depth, a peripheral casing therefor which is turned so as to pass around the inlet end of said wheel and inside of the same being spaced therefrom and the edge of which at the intake end is curved toward said wheel so far as to isolate the positve end of the blades from the recirculating current and to isolate the negative end of the blades from the incoming fresh air.

2. A centrifugal fan having a wheel with blades wherein the axial length is greater than the radial depth, a peripheral casing therefor, an eye connected to said casing and providing therewith a recirculating air space around the periphery and intake end of the wheel and then turned outwardly toward the inner edge of said blades whereby the recirculating air current is effectually isolated from the incoming fresh air and delivered on to the intake ends of the blades without being previously permitted to mix with the incoming fresh air.

3. A centrifugal fan having a wheel with blades wherein the axial length is greater than the radial depth, a peripheral casing therefor which extends around the intake ends of said blades and the end of which is turned inside of said wheel and is then curved outwardly toward said blades so that its terminal edge expands adjacent to but not beyond the neutral part of said blades, said casing spaced apart from the periphery intake end and inside of said blades whereby the positive ends of said blades are isolated from the current of air recirculated around the negative ends thereof and the negative ends of said blades are isolated from the incoming fresh air.

In witness whereof, I have hereunto signed my name in the presence of two subscribing witnesses.

SAMUEL CLELAND DAVIDSON.

Witnesses:
  JOHN JOHNSON,
  HUGH TAYLOR COULTER.